United States Patent [19]

Steveninck

[11] 3,729,942
[45] May 1, 1973

[54] RAPID CONSOLIDATION OF FLUIDIZED SAND BED

[75] Inventor: Johannes Van Steveninck, Rijswijk, Netherlands

[73] Assignee: Shell Oil Company, New York, N.Y.

[22] Filed: July 23, 1971

[21] Appl. No.: 165,602

[30] Foreign Application Priority Data

Aug. 21, 1970 Great Britain.....................40,451/70

[52] U.S. Cl. ...........................61/72.4, 61/35, 61/63
[51] Int. Cl..............................F16l 1/00, E02f 5/02
[58] Field of Search......................61/72.4, 36, 1, 63, 61/35

[56] References Cited

UNITED STATES PATENTS 2,693,085  11/1954  Salnikov..............................61/72.4
3,256,695  6/1966  Bodine, Jr. ..........................61/72.3

FOREIGN PATENTS OR APPLICATIONS 1,372,743  8/1964  France ...............................61/72.4

Primary Examiner—Jacob Shapiro
Attorney—Rand N. Shulman et al.

[57] ABSTRACT

Method and apparatus for obtaining rapid consolidation of the fluidized sand mass on top of a submarine pipeline buried in the bottom of a body of water by fluidization of the bottom. Rapid consolidation is obtained by reducing the flow rate of the water injected into the bottom to about a third of the minimum flow rate necessary for fluidization of the bottom.

7 Claims, 2 Drawing Figures

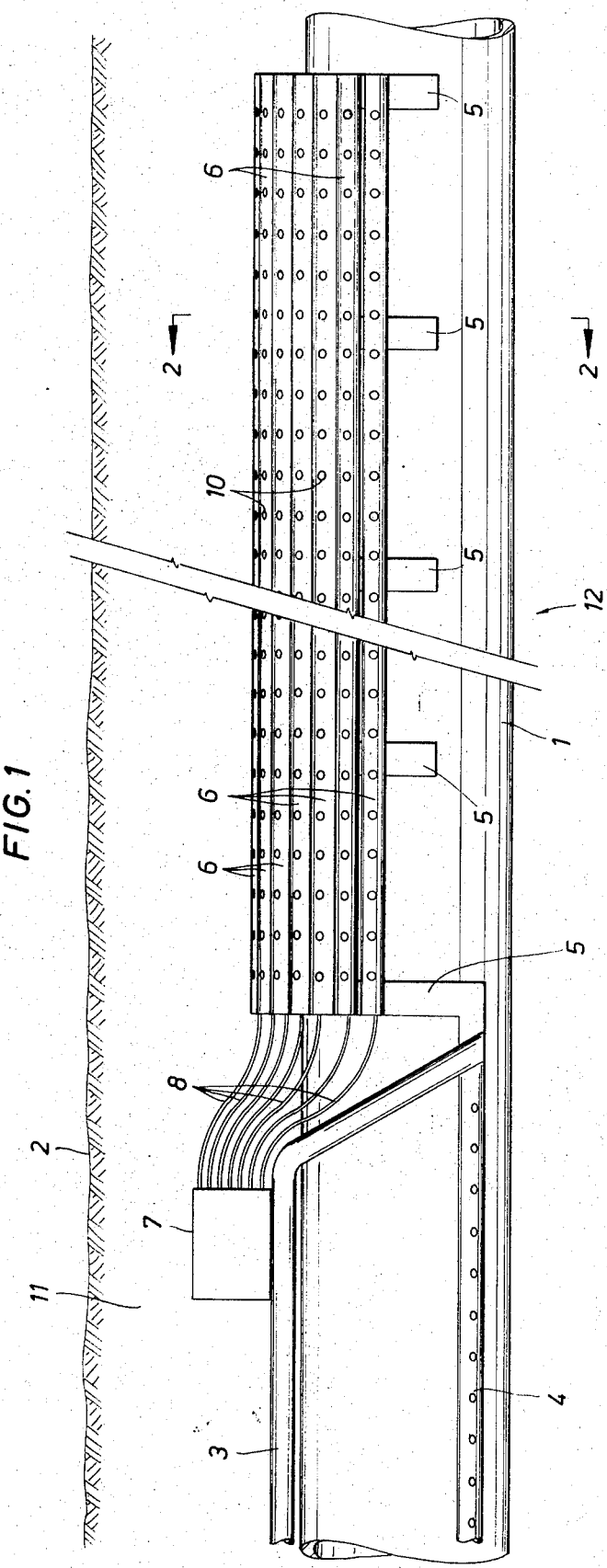
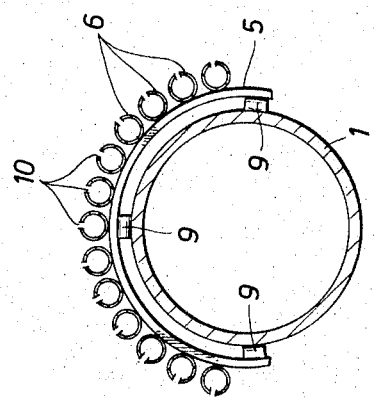
J. Van Steveninck
INVENTOR

RAPID CONSOLIDATION OF FLUIDIZED SAND BED

FIELD OF THE INVENTION

The invention relates to method and apparatus for burying an object such as a pipeline extending in a horizontal direction, in the bottom of a body of water.

The invention relates in particular to method and apparatus of the kind disclosed in applicant's copending patent applications Ser. No. 85,529 filed Oct. 30, 1970, and Ser. No. 105,201 filed Jan. 11, 1971, and in a commonly assigned application of P.J. De Geeter, Ser. No. 40,407 filed May 25, 1970.

DESCRIPTION OF THE PRIOR ART

The method according to these copending patent applications comprises fluidizing the bottom of a body of water by injecting water or other fluid into the bottom adjacent to the object, and allowing the object to sink into the fluidized bottom. According to one embodiment of this method, in order to obtain fluidization of the bottom, a fluidization device injecting water into the bottom adjacent to the object is moved along the object in a horizontal direction.

When the fluidization device moves along the object to be buried, for example, a conduit such as a pipeline or an electric cable, the bottom adjacent to the object is fluidized. The pipeline sinks into the fluidized bottom and is immediately covered with an unconsolidated mass of bottom material (for example sand). At this moment the shear stress that can be transmitted by the loosely packed bottom material is zero. The pipeline having a lower specific weight than the unpacked bottom material is at this moment only kept down due to its stiffness by part of the pipeline father away behind the fluidization device where it is already covered with more or less consolidated bottom material. This consolidation, however, is a time-dependent volume reduction that involves a decrease of the water content of the bottom material.

SUMMARY OF THE INVENTION

Now the applicant has found that is is possible to speed up the consolidation of the fluidized bottom material after the object has sunk into the fluidized bottom material by injecting a fluid such as water into the bottom adjacent to the object at a flow rate which is about a third of the minimum flow rate necessary for obtaining fluidization of the bottom.

In the method according to the invention, in order to obtain fluidization of the bottom, a fluidzation device injecting water into the bottom adjacent to the object can be moved along the object in a horizontal direction, whereafter, in order to obtain consolidation of the fluidized bottom, a consolidation device injecting water into the bottom adjacent to the object is moved along the object in a horizontal direction.

A consolidation device according to the invention which is adapted to move along an object extending in a horizontal direction comprises a number of spaced apart saddles adapted to slide along the upper part of the object, the saddles being interconnected by a plurality of pipes, the pipes being provided with a large number of openings or nozzles for injecting water into the bottom adjacent to the object, and means for supplying water to the pipes.

BRIEF DESCRIPTION OF THE DRAWINGS

FIG. 1 shows a side view of part of a pipeline, of part of a fluidization device and of a consolidation device arranged on the pipeline.

FIG. 2 shows on an enlarged scale a cross-section 22 of the consolidation device and the pipeline.

DESCRIPTION OF A PREFERRED EMBODIMENT

Tests carried out with North-Sea sand and with water as the operating liquid have shown that the minimum quantity of water required to bring and keep a bed of sand particles in the fully fluidized state is given by the equation:

$$G_o = \frac{0.0035 \delta^2 (\gamma_s - \gamma_f) \gamma_f \varphi^3 g}{\eta (1-\varphi)}$$

wherein:

$G_o$ = flow rate of the water per unit area of the bed fluidized in g/cm². sec;
$\delta$ = particle diameter in cm;
$\gamma_s$ = specific weight of the solid material in g/cm³;
$\gamma_f$ = specific weight of the operating liquid in g/cm³;
$\phi$ = porosity, dimensionless;
$\eta$ = dynamic viscosity in g/cm. sec;
$g$ = acceleration of gravity in cm/sec²

For sea sand with an average particle diameter of 0.035 cm a value for $G_o$ of about 0.7 g/cm². sec was found, which is the minimum flow rate of the water per unit area fluidized necessary for fluidizing the sand bed. It has now been found that, after the fluidization of the sand bed, a minimum bed height and thus a maximum consolidation of the bed can be obtained by reducing the flow rate of the water per unit area of bed to about a third of the flow rate of the water per unit area required to fluidize the sand bed fully. For example, for the above-mentioned sand, a minimum bed height was obtained by using a flow rate of the water per unit area of bed of about 0.2 g/cm². sec.

In FIG. 1 part of a pipeline 1 is shown in buried condition. A fluidization device 3 is arranged on the pipeline 1 and has fluidized the bottom material 11 adjacent to the pipeline 1 which has caused the pipeline 1 to sink into the fluidized bottom material 11. The fluidization device 3, which has openings or nozzles 4 for injecting water into the bottom material, has been described extensively in the above-mentioned earlier copending patent applications, so that for a complete understanding thereof reference is made to these earlier copending patent applications.

According to the invention a consolidation device 12 is connected to the rear end of the fluidization device 3. The consolidation device 12 comprises a number of spaced apart saddles 5 which are interconnected by a plurality of pipes 6 having a plurality of generally upwardly directed nozzles or openings 10 advantageously spaced along the pipes 6 at intervals of about 15 cm to insure treatment of the entire bottom portion above the pipeline 1. The saddles 5 are basically horseshoe-shaped and are adapted to slide over the top part of the pipeline 1. In order to reduce friction between the saddles 5 and the pipeline 1 the inner sides of the saddles 5 are preferably provided with rollers 9, for example made of rubber rotatably mounted in any suitable manner. A pumping system 7 is arranged on the fluidization device 3, the system 7 being connected by conduits 8, for example hoses, to the pipes 6. The surface of the bottom of the body of water, for example the seabed, is indicated by the reference numeral 2.

The operation of the above apparatus is as follows. The fluidization device 3 is moved along the pipeline 1 which is to be buried. Water leaving the openings or nozzles 4 is injected into the bottom material, which causes the bottom material 11 to be fluidized. Because of the fluidization of the bottom material the pipe will sink under its own weight and under the weight of the fluidization device 3 into the bottom to a desired depth. This method of burying a pipeline has already been described extensively in the above-mentioned earlier copending patent applications.

After burying of the pipeline 1 in the above-mentioned manner, it conventionally takes several hours before the bottom material has more or less consolidated again. To speed up the consolidation of the bottom material after burying of the pipeline, the fluidization device is followed by the conslidation device 12.

The consolidation device 12 is moved along the pipeline 1. The pumping system 7 pumps a consolidating fluid such as water through the conduits 8 to the pipes 6 of the consolidation device 12. The water leaves the pipes 6 through the openings or nozzles 10 and is injected into the unconsolidated bottom material along the pipeline 1. The flow rate of the water per unit area of ocean bottom 2 to be consolidated injected into the bottom material by the consolidation device 10 is about a third of the minimum flow rate of the water per unit area of bottom necessary for obtaining fluidization of the bottom material. In this manner an accelerated consolidation of the bottom material along the pipeline, after burying of the pipeline, is obtained.

The method according to the invention can be used in burying all kinds of objects, extending in a horizontal direction, such as conduits, for example pipelines or electric cables, beams or bars and similar objects.

I claim as my invention:

1. A method of burying an object which extends in a horizontal direction in the bottom of a body of water, comprising the steps of:
   fluidizing the bottom by injecting a fluid into the bottom adjacent to the object;
   allowing the object to sink into the fluidized bottom; and finally
   consolidating the bottom by injecting water into the bottom adjacent to the object at a flow rate which is about a third of the minimum flow rate necessary for obtaining fluidization of the bottom.

2. The method of claim 1, wherein in order to obtain fluidization of the bottom, a fluidization device injecting water downwardly into the bottom adjacent the object is moved along the object in a horizontal direction and where in order to obtain consolidation of the fluidized bottom, a consolidation device injecting water upwardly into the bottom adjacent to the object is moved along the object in a horizontal direction.

3. The method of claim 1 wherein the object to be buried is a conduit.

4. The method of claim 1 wherein the bottom is consolidated by injecting a consolidation fluid into the bottom adjacent the object at a flow rate per unit area of bottom to be consolidated substantially equal to one third the flow rate, $G_o$, defined by the equation $$G_o = \frac{0.0035 \delta^2 (\gamma_s - \gamma_f) \gamma_f \varphi^3 g}{\eta (1 - \varphi)}$$

where $G_o$ = flow rate of injected fluid per unit area of bed to be consolidated in g/(cm$^2$)(sec);
$\delta$ = average diameter in cm of particles which compose the bottom material;
$\gamma_s$ = specific weight of bottom material in g/cm$^3$;
$\gamma_f$ = specific weight of injected fluid in g/cm$^3$;
$\phi$ = porosity of bottom material;
$\eta$ = dynamic viscosity of injected fluid in g/(cm)(sec);
$g$ = acceleration of gravity, cm/sec$^2$.

5. An improved apparatus for burying a conduit in the bottom of a body of water of the type which is adapted to slide along the conduit and which includes a fluidization section comprising a plurality of fluidization pipes positioned, in operation, to inject fluid into the bottom material in a generally downward direction to fluidize material below the pipeline, wherein the improvement comprises:
   a consolidation device, connected to the fluidization section and posi-tioned rearwardly thereof, comprising
   a number of spaced apart saddles adapted to slide along the upper part of the conduit;
   a plurality of pipes interconnecting the saddles, the pipes being provided with a large number of upwardly directed openings or nozzles for injecting water into the bottom material adjacent to the object;
   and means for supplying water to the pipes.

6. The consolidation device of claim 5, wherein the distance between the openings or nozzles is about 15 cm.

7. The consolidation device of claim 5 including a plurality of rollers mounted on the inner sides of the saddles.

* * * * *